May 8, 1962 R. B. BROWN ETAL 3,033,490
VERTICAL TAKE-OFF AND LANDING AIRCRAFT
Filed April 30, 1959 2 Sheets-Sheet 1

INVENTORS.
KEITH G. BRADY
ROBERT B. BROWN
BY VICTOR M. SANDERS

ATTORNEY

INVENTORS.
KEITH G. BRADY
ROBERT B. BROWN
BY VICTOR M. SANDERS

ATTORNEY

United States Patent Office 3,033,490
Patented May 8, 1962

3,033,490
VERTICAL TAKE-OFF AND LANDING AIRCRAFT
Robert B. Brown, Clinton, and Keith G. Brady and Victor M. Sanders, Bellevue, Wash., assignors to Boeing Airplane Company, Seattle, Wash., a corporation of Delaware
Filed Apr. 30, 1959, Ser. No. 810,177
11 Claims. (Cl. 244—12)

This invention relates to aircraft capable of all modes of flight inclusive of vertical, short and conventional take offs and landings, and more particularly to such an aircraft having substantially a fixed wing and rotatably mounted power plants.

This invention, briefly described, is a winged aircraft capable of all aspects of vertical, transitional and horizontal flight, having a balanced arrangement of multiple rotatable propulsion units about its center of gravity, inclusive of power plants located both at the wing tips in an end plate configuration and on the forward end of the fuselage in a canard surface configuration.

The purpose of the invention is to provide an aircraft with substantially all the advantages of efficient cruise and high speed flight aircraft while gaining the operational values of short or vertical take off and landing aircraft.

There is a need for an airplane of this type today. The increased horsepower that is now available in improved, smaller, engines, having high thrust-to-weight ratios while providing opportunity for higher speeds has also provided the opportunity of raising aircraft off the ground by thrust alone, no reliance being placed on developing airfoil lifts. Such engine capacity, making vertical take-off feasible with jets, permits the design of an aircraft which may "leave" a designated spot at lower speeds climbing by thrust alone until sufficient altitude is gained and thereafter proceeding to its destination at higher speeds relying essentially on power plant thrust for speed and wing lift for sustentation. Then, on "arrival," relaying on thrust alone again, such an aircraft is conveniently landed at lower speeds. When following such a flight pattern, inclusive of vertical and horizontal flight wherein the transition between vertical and horizontal flight is substantially accomplished while "in the air," there no longer is a need for having extensive prepared areas to accommodate aircraft runways and approaches to such runways.

This airplane capable of such performance in part resembles some aircraft primarily designed in the past for continuous wing lift flight, however, it has design departures pertaining to those components which make short or vertical take offs and landings possible.

Figure 1:
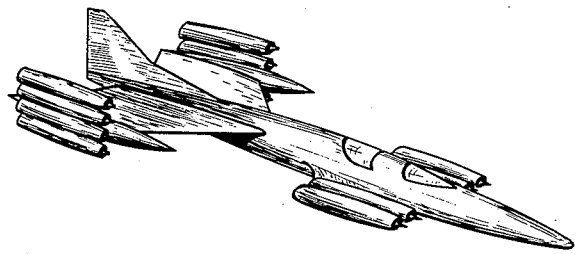
Figure 2:
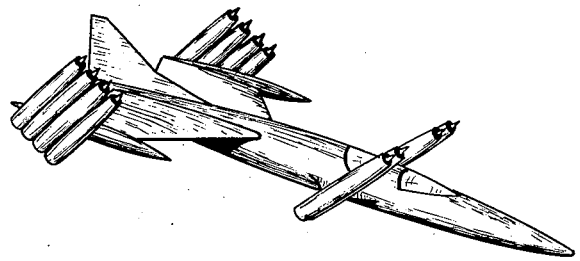
Figure 3:
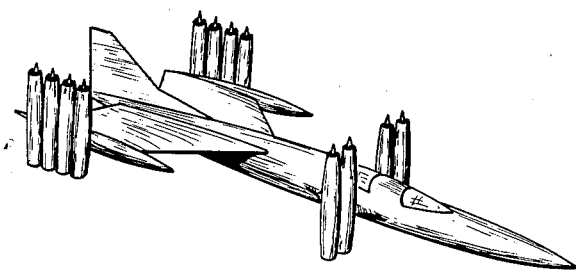
Figure 4:
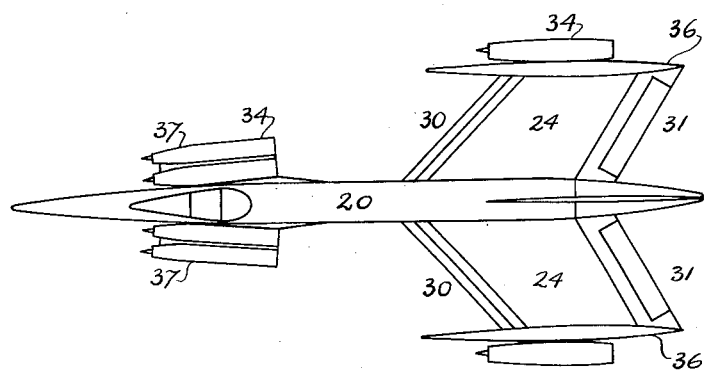
Figure 5:
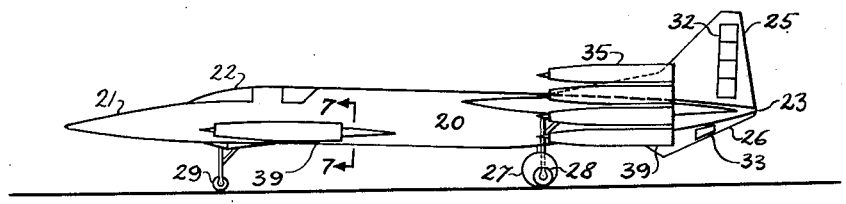
Figure 6:
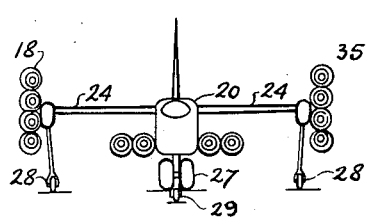
Figure 7:
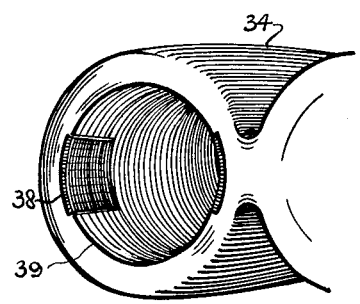

The structure, component arrangements, and operation of this aircraft will best be understood by reference to the drawings wherein:

FIGURE 1 is a perspective view of the airplane while cruising, or in horizontal flight, FIGURE 2 is a perspective view of the airplane during transitional flight, FIGURE 3 is a perspective view of the aircraft in vertical flight, FIGURE 4 is a top view of the airplane, FIGURE 5 is a side view of the airplane, FIGURE 6 is a front view of the airplane, and FIGURE 7 is a perspective end view of an engine exhaust nozzle and deflector tabs.

With respect to the structure and component arrangements, the fuselage 20 is quite conventional. Near its forward end 21 is the crew compartment 22. Near its tail 23 are wings 24 on either side which are the substantially fixed main sustaining airfoil surfaces. Arising above the tail 23 is the vertical tail surface 25 and extending below this tail surface 25 is the ventral 26. Extendable below the airplane is a tricycle type landing gear, with retractable main wheels 27 located below the fuselage 20 near the center of gravity of the airplane, retractable main wing tip wheels 28 and a retractable forward wheel 29 also located below the fuselage 20.

With respect to aerodynamic controls, movable airfoils are located on the main wings 24, the vertical tail 25 and the ventral 26. On the main wings 24 are leading edge flaps 30 and trailing edge elevons 31 all operating conventionally. On both sides of the vertical tail are multiple airfoils 32 each one acting alternately both as speed brakes and as spoilers for directional control, and below on both sides of the ventral are additional speed brake airfoils 33, all operating conventionally.

With respect to thrust units, power plants 34 are strategically located both fore and aft and laterally, about the center of gravity of the airplane so their combined centroid is substantially at the center of gravity. With all the engines located about the center of gravity in this manner, longitudinal thrust balance, thus longitudinal control, and lateral thrust balance, thus lateral control, are all acquired. The aft power plants are pivotally mounted at the wing tip, on pods 36 in vertical "end plate" clusters 35 of multiple units capable of rotation, from cruise flight positions through vertical flight positions. The vertical clusters 35 also provide vertical areas to supplement the vertical tail 25 during horizontal or cruise flight acquiring additional directional stability. The forward power plants are pivotally mounted on the fuselage 20 in horizontal "canard" clusters 37 of multiple units, also capable of rotation from cruise flight positions through vertical flight positions, the latter in regard to all power plants, including an angular position that is at least 10° past the vertical.

This arrangement of structure, components, control surfaces and power plants is the basis of the airplane's successful operation through vertical, transitional and horizontal or cruise flight. For vertical flight, the engines are rotated to substantially their 90° positions and power is applied and relied upon for all lift. The pilot utilizes conventional controls, i.e., rudder pedals, and stick control. For longitudinal and lateral control throttle adjustments are made through movement of the stick control, no additional direct throttle adjustments being necessary. This is true even in the event of an engine failure, in whole or in part. Directional control, as necessary during this time of flight, is accomplished by utilizing the rudder pedals to selectively move small deflector tabs 38 into the exhaust jet streams from their retracted positions to deflect the exhaust jet, thus changing the airplane heading. The deflector tabs 38 may be located, for example, inside the nozzle 39 of the engines 34, as shown in FIGURE 7, where both tabs are shown in their retracted position.

For transitional flight, after sufficient altitude is gained through vertical flight operation with the engines remaining in the vertical position, the pilot by initiating changes of the engine tile angle controls rotates the engines thus producing a horizontal propulsive thrust component causing forward motion of the aircraft, increasing its forward speed resulting in the transfer of the lift requirements to the airfoil surfaces, the transfer, occurring when forward flight is desired, being as abrupt or as gradual as the pilot cares to make it under the circumstances within the extensive flight capabilities of the aircraft.

For horizontal or cruise flight, after the airfoils are providing sufficient lift, the need for thrust components in the vertical direction consequently diminishes, and substantially all the thrust contributes to the forward motion of the aircraft. By astute control of the angular placement of the vertical cluster engines by the pilot, that is the angular relationship relative to the air stream of flight, the incoming air to these engines is received under the most satisfactory flow conditions possible, materially increasing their efficiency.

Under cruise conditions the forward propulsion units arranged in horizontal clusters by proper angular adjustment simulate canard surfaces acquiring the necessary control to trim the aircraft.

At the completion of the cruise flight condition and at the commencement of a normal let down as the landing area is approached, the engines are again tilted, flaps are lowered and transitional flight is undertaken reducing the forward speed until upon further rotation of the engines the airplane hovers in vertical flight as the lift is fully supplied again by the thrust of the engines.

The success of the control of the aircraft throughout all these flight conditions is substantially dependent on the strategic location and functioning of all the aircraft components, but especially of the engines. Their pivotal arrangement at locations fore and aft, and laterally about the center of gravity of the airplane so their combined centroid is at this center of gravity is the primary basis for the excellent lateral and longitudinal control, resulting in a very dependable flying system throughout all the modes of flight, vertical, transitional and horizontal or cruise. The dependability and efficiency in cruise flight is further enhanced by the forward horizontal cluster power plants, serving as canard surfaces and the wing tip vertical cluster power plants, aft of the center of gravity, serving both as aerodynamic "end plates" and as "vertical surfaces" supplementing the vertical tail surfaces to provide additional directional stability during horizontal or cruise flight.

We claim as our invention:

1. An airplane for all modes of flight, vertical, hovering, transitional, horizontal high speed and cruise, comprising a fuselage for personnel, fuel, cargo, flight equipment and controls, a retractable landing gear extending below the fuselage and wings, vertical tail at the rear of the fuselage having control surfaces on both sides acting both as spoilers for directional control and as speed brakes, a ventral extending substantially below the vertical tail having speed brakes on both sides, primary wing surfaces extending out from the fuselage near the tail having leading edge flaps and trailing edge elevons, vertical clusters of multiple power plants vertically-rotatably mounted at each tip of the primary wing surfaces, and horizontal clusters of multiple power plants vertically-rotatably mounted on the fuselage near the nose of the airplane, all power plants being arranged so their centroid is substantially at the center of gravity of the entire aircraft.

2. An airplane as defined in claim 1 wherein the vertical clusters of the multiple power plants aerodynamically simulate end plate airfoils and provide additional vertical surfaces for directional stability.

3. An airplane as defined in claim 1 wherein the forward horizontal clusters of multiple power plants perform the trim and control functions of canard airfoils.

4. An airplane for vertical, transitional and horizontal flight comprising a fuselage; primary wings supported on both sides of the aft portion of the fuselage; vertical tails extending above and below the aft portion of the fuselage; landing gear consisting of main units on the center line of aft portion of fuselage, an auxiliary fuselage nose landing gear unit and primary wing tip landing gear units; and rotatably mounted main thrust producing power plants located both at the primary wing tips and at the forward end of the fuselage, all such power plants being adjustable to controllably direct thrust, thereby producing lift, trim and other directional propulsive forces.

5. In an airplane, as defined in claim 4, the improvement of a vertical, rotatable mounting for multiple power plants in horizontal clusters in a canard configuration near the forward end of the fuselage.

6. In an airplane, as defined in claim 5, the improvement of a vertical, rotatable mounting for multiple power plants in vertical clusters at the wing tips to provide both aerodynamic end plate effects and additional vertical surfaces for directional stability.

7. An airplane having a fuselage, a horizontal wing extending from both sides of the aft portion of the fuselage, a vertical tail at the aft portion of the fuselage, landing gear extended from the fuselage and wing tips, and rotatably mounted thrust producing power plants located at both the horizontal wing tips in end plate-like vertical clusters and at the forward end of the fuselage in canard-like horizontal clusters, the centroid of all the power plants substantially coinciding with the center of gravity of the airplane.

8. The improvement in a vertical take off and landing airplane having a fuselage, landing gear, primary wing structure, variable lift airfoils, and directional and braking control surfaces, comprising rotatably mounted thrust producing power plants located both at the wing tips in vertical end plate-like clusters aligned parallel to the fuselage and at the fuselage nose in horizontal canard-like clusters with each power plant arranged parallel to the other power plant in its immediate port or starboard cluster, and with each port and starboard cluster being directed at its entry toward one another a slight amount.

9. An airplane for all modes of flight, vertical, horizontal, transitional, and hovering, comprising airplane structure supporting and directing the carried loads by its integral airfoil structure that creates the aerodynamic lift and control forces; and airplane power plants of sufficient thrust producing capacity to lift the loaded airplane vertically without using any airfoil lift capacity, arranged on the airplane structure in essentially a triangular configuration with three potentially equal horsepower groups of power plants, two aft groups of power plants being mounted on the rear of the airplane structure equally spaced from the airplane's centerline and opposite one another, and the forward group of power plants being mounted on the front of the airplane structure divided about the airplane centerline and positioned closely adjacent to the airplane structure on vertical plane of rotation mounts on each side of the forward airplane structure for rotatably holding the power plants of this said forward group in horizontal clusters in a canard configuration, so that the centroid of the combined power plants is substantially at the center of gravity of the entire airplane.

10. An airplane for all modes of flight, vertical, horizontal, transitional, and hovering, comprising airplane structure supporting and directing the carried loads by its integral airfoil structure that creates the aerodynamic lift and control forces; and airplane power plants of sufficient thrust producing capacity to lift the loaded airplane vertically without using any airfoil lift capacity, arranged on the airplane structure in essentially a triangular configuration with three potentially equal horsepower groups of power plants, two aft groups of power plants being mounted on the rear of the airplane structure equally spaced from the airplane's centerline and opposite one another on vertical plane of rotation mounts on each side of the rear airplane structure for rotatably holding the power plants of these said aft groups in vertical clusters at the wing tips to provide both aerodynamic end plate effects and additional vertical surfaces for directional stability, and the forward group of power plants being mounted on the front of the airplane structure divided about the airplane centerline and positioned closely adjacent to the airplane structure, so that the centroid of the combined power plants is substantially at the center of gravity of the entire airplane.

11. An airplane for flight operations that include vertical take off and landings and extensive range flights at high speeds necessitating reliance on power units that are fully relied upon for lift forces during vertical take offs and landings and thereafter are relied upon for efficient directional thrust but not direct lift forces, comprising a fuselage, a primary wing structure extending out from both sides of the fuselage near the rear of the airplane, and rotatable power plants mounted both at the extremities of the primary wing structure and at the forward end of the fuselage, the said power plants mounted at the forward end being attached to one another and to the fuselage in opposite paired horizontal clusters that produce canard control forces, the center of gravity of all the rotatable power plants being located substantially at the center of gravity of the entire airplane.

References Cited in the file of this patent

UNITED STATES PATENTS

| | | |
|---|---|---|
| 2,402,311 | Bissett | June 18, 1946 |
| 2,654,552 | Jonas | Oct. 6, 1953 |
| 2,762,584 | Price | Sept. 11, 1956 |
| 2,926,868 | Taylor | Mar. 1, 1960 |

FOREIGN PATENTS

| | | |
|---|---|---|
| 211,429 | Australia | Oct. 29, 1957 |
| 1,053,321 | Germany | Mar. 19, 1959 |